(12) United States Patent
Watanabe et al.

(10) Patent No.: US 10,085,018 B2
(45) Date of Patent: Sep. 25, 2018

(54) IMAGE ENCODING METHOD, IMAGE ENCODING APPARATUS, AND IMAGE ENCODING PROGRAM

(71) Applicant: NIPPON TELEGRAPH AND TELEPHONE CORPORATION, Tokyo (JP)

(72) Inventors: Mayuko Watanabe, Yokosuka (JP); Masaki Kitahara, Yokosuka (JP); Atsushi Shimizu, Yokosuka (JP)

(73) Assignee: Nippon Telegraph And Telephone Corporation, Tokyo (JP)

( * ) Notice: Subject to any disclaimer, the term of this patent is extended or adjusted under 35 U.S.C. 154(b) by 48 days.

(21) Appl. No.: 14/906,407

(22) PCT Filed: Jul. 22, 2014

(86) PCT No.: PCT/JP2014/069296
§ 371 (c)(1),
(2) Date: Jan. 20, 2016

(87) PCT Pub. No.: WO2015/012256
PCT Pub. Date: Jan. 29, 2015

(65) Prior Publication Data
US 2016/0182904 A1 Jun. 23, 2016

(30) Foreign Application Priority Data

Jul. 25, 2013 (JP) ................. 2013-155034

(51) Int. Cl.
*H04N 19/11* (2014.01)
*H04N 19/176* (2014.01)
(Continued)

(52) U.S. Cl.
CPC ........... *H04N 19/11* (2014.11); *H04N 19/132* (2014.11); *H04N 19/147* (2014.11);
(Continued)

(58) Field of Classification Search
CPC .... H04N 19/11; H04N 19/132; H04N 19/147; H04N 19/176; H04N 19/436
See application file for complete search history.

(56) References Cited

U.S. PATENT DOCUMENTS

| 2009/0297053 | A1 | 12/2009 | Nakamura et al. | |
| 2010/0054334 | A1* | 3/2010 | Yoo | H04N 19/176 375/240.14 |
| 2013/0308702 | A1* | 11/2013 | Kadoto | H04N 19/176 375/240.12 |

FOREIGN PATENT DOCUMENTS

| JP | 2005-348280 A | 12/2005 |
| JP | 2008-166916 A | 7/2008 |

(Continued)

OTHER PUBLICATIONS

Extended European Search Report for EP14829177.6, EPO, Munich, dated Mar. 3, 2017.
(Continued)

*Primary Examiner* — Christopher Findley
(74) *Attorney, Agent, or Firm* — Harness, Dickey & Pierce, P.L.C.

(57) ABSTRACT

An image encoding apparatus capable of reducing the computational complexity in intra-prediction of an encoding optimization process is provided. The image encoding apparatus includes a reference pixel generation unit that generates reference pixels from predicted pixels of neighboring pixels and pixels of an original image for intra-prediction directions, a pseudo intra-predicted pixel generation unit that generates pseudo intra-predicted pixels from the reference pixels and the intra-prediction directions, a coding cost calculation unit that calculates coding costs for the intra-prediction directions from errors between the pseudo intra-predicted pixels and the pixels of the original image and generated bit amounts when the pseudo intra-predicted (Continued)

pixels are generated, and an intra-prediction direction setting unit that sets an intra-prediction direction corresponding to the lowest coding cost among the coding costs as an optimal intra-prediction direction.

4 Claims, 14 Drawing Sheets

(51) Int. Cl.
  *H04N 19/147* (2014.01)
  *H04N 19/132* (2014.01)
  *H04N 19/436* (2014.01)
  *H04N 19/119* (2014.01)

(52) U.S. Cl.
  CPC ......... *H04N 19/176* (2014.11); *H04N 19/436* (2014.11); *H04N 19/119* (2014.11)

(56) References Cited

FOREIGN PATENT DOCUMENTS

| JP | 2008-252346 A | 10/2008 |
|---|---|---|
| JP | 2009-290498 A | 12/2009 |
| JP | 2013-524670 A | 6/2013 |
| WO | WO-2011/126157 A1 | 10/2011 |
| WO | WO-2012/111208 A1 | 8/2012 |

OTHER PUBLICATIONS

Seiji Mochizuki et al.: "A low power and high picture quality H. 264/MPEG-4 video codec IP for HD mobile applications", 2007 IEEE Asian Solid-State Circuits Conference IEEE Piscataway, NJ, USA, Nov. 1, 2007 (Nov. 1, 2007), pp. 176-179.

Takafumi Bando, Naoyuki Hirai, Tian Song, and Takashi Shimamoto, "New Prediction Modes for Parallel Processing of H.264/AVC", Proceedings of International Conference on Multimedia and Signal Processing (CMSP'11), pp. 344-347, Guilin, China, May 2011.

Sakae Okubo, Teruhiko Suzuki, Seishi Takamura, and Takeshi Chujo, "Impress standard textbook series H.265/HEVC textbook", Impress Japan, Oct. 18, 2013, with partial translation thereof.

K. McCann, B. Bross, W.-J. Han, I. K. Kim, K. Sugimoto, G. J. Sullivan, "High Efficiency Video Coding (HEVC) Test Model 15 (HM 15) Encoder Description", Joint Collaborative Team on Video Coding (JCT-VC), document JCTVC-Q1002, Mar. 2014.

International Search Report for PCT/JP2014/069296, ISA/JP, dated Oct. 21, 2014.

Notice of Allowance for Japanese patent application No. 2013-155034, dated Mar. 3, 2015.

\* cited by examiner

IMAGE ENCODING METHOD, IMAGE ENCODING APPARATUS, AND IMAGE ENCODING PROGRAM

CROSS-REFERENCE TO RELATED APPLICATIONS

This application is a 371 U.S. National Stage of International Application No. PCT/JP2014/069296, filed Jul. 22, 2014. This application claims priority to Japanese Patent Application No. 2013-155034, filed Jul. 25, 2013. The disclosures of the above applications are incorporated herein by reference.

TECHNICAL FIELD

The present invention relates to an image encoding method, an image encoding apparatus, and an image encoding program.

BACKGROUND ART

High efficiency video coding (HEVC) developed as a next video coding standard scheme of a standard H.264, which is a conventional art, is a coding scheme for realizing higher coding efficiency than the standard H.264. However, the HEVC involves complicated processes and large computational complexity, and thus the HEVC has a problem that a computational cost of coding should be significantly reduced in order to employ the HEVC in actual products. In particular, in the HEVC, since options for the size of a block, which is a unit of coding, increase, processes associated with optimization of coding in which an optimal block size and an optimal mode are determined increase and thus it is necessary to reduce the computational complexity thereof.

In video coding, pixels are generally coded in units of blocks. In the HEVC, concepts of a largest coding unit (LCU) and a coding unit (CU) are introduced as blocks for which coding is performed, and a concept of a prediction unit (PU) is introduced as a unit of prediction. Hereinafter, the LCU, the CU, and the PU will be described. In the HEVC, one picture (image) is equally divided into squares having a given size, as illustrated in FIG. 11. FIG. 11 is a diagram illustrating an example of division of a picture. The square blocks illustrated in FIG. 11 are referred to as LCUs. The sizes of the LCUs can be selected from among 16×16 pixels, 32×32 pixels, and 64×64 pixels, but are all the same within one picture.

A CU, which is a unit for performing actual coding, is a square block that exists in one LCU, and a prediction mode is determined using the CU as a unit. The CU is a block having the same size as the LCU, or, as illustrated in FIG. 11, the CU is a square block obtained by equally dividing the LCU in four or a square block obtained by repeatedly applying such a quadrisection process to the LCU. When the size of the LCU is $(2^N) \times (2^N)$, the size of the CU can be selected from among $(2^M) \times (2^M)$ ($3 \leq M \leq N$, where N and M are integers).

Further, the PU is a unit for setting a prediction direction in the CU. FIGS. 12A and 12B are diagrams illustrating examples of options for division into PUs (PU division types). As illustrated in FIG. 12A, in inter-prediction, selection from eight division methods is possible. Further, as illustrated in FIG. 12B, in intra-prediction, selection from two division methods is possible only when a CU size is 8×8. In other cases, the PU is the same as the CU. For improvement of coding efficiency, it is necessary to perform division into CUs and setting of a prediction mode of each CU suitable for each LCU. In particular, while a degree of freedom of selection of the division method of the CU and the prediction mode increases as the size of the LCU increases, and improvement of coding efficiency is expected by performing appropriate division into CUs and appropriate setting of a prediction mode, there is a problem in that it is necessary to perform a computation on all CUs that can be options and thus the computational complexity increases accordingly.

An actual process regarding selection of the CU size in one LCU will be described using an example of an HEVC test model (HM). An operation of a coding cost calculation process for a determination of shapes of divided PUs in one CU will first be described with reference to FIG. 13. FIG. 13 is a flowchart illustrating an operation of a coding cost calculation process for a determination of shapes of divided PUs in one CU. First, inter-prediction is performed for each PU division type (step S71). Then, if a coding cost is the lowest, the lowest coding cost, and shapes of the divided PUs and an inter-prediction direction that realize the lowest coding cost are stored (step S72).

Then, intra-prediction is performed for each PU division type (step S73). Then, if a coding cost is the lowest, the lowest coding cost, and shapes of divided PUs and an intra-prediction direction that realize the lowest coding cost are stored (step S74).

Next, an operation of a coding cost calculation process for a determination of the CU division size in one LCU will be described with reference to FIG. 14. FIG. 14 is a flowchart illustrating the operation of the coding cost calculation process for a selection of the CU division size in one LCU. First, steps S71 to S74 illustrated in FIG. 13 are repeated in one CU to calculate coding costs for CUs of all sizes and determine CU sizes (step S75). For an LCU, the coding cost when a CU is divided into four is compared with the coding cost when the CU is not divided into four, the division size of the CU in which the coding cost is the lowest is selected, and the selected division size is stored (step S76).

It is to be noted that a QP loop, which is not described above, is illustrated in FIG. 14. In the HEVC, a quantization parameter QP that determines a quantization step size can be set for each CU if encoding is not performed using a fixed quantization parameter QP. In order to realize this, a structure of calculating an optimal coding cost while changing the value of the quantization parameter QP is included in reference software. Therefore, the QP loop is illustrated in FIG. 14.

A process of selecting an optimal mode, division shape, and division size to obtain the lowest coding cost is referred to as a coding optimization process. It is to be noted that while representations "LCU" and "CU" are used hereinafter as concepts of units of processing in the HEVC, units corresponding to the LCU and the CU are more generally represented as a block and a sub-block, respectively, taking other coding technologies into consideration.

Next, an operation of the coding optimization process will be described. FIG. 15 is a flowchart illustrating the operation of the coding optimization process. First, coding costs of an inter-prediction mode, a skip mode, and an intra-prediction mode are calculated (step S77). Subsequently, a mode in which the coding cost is the lowest is used as a prediction mode for each CU size, and an optimal mode is set and stored (step S78). This process is repeated for all the CU sizes. Then, a combination of divided CUs in which the coding cost is the lowest is determined (step S79).

Here, the coding cost means an RD cost as represented by Equation (1), and the optimization means a determination of coding by which the coding cost is the lowest.

$$RD\ cost = D + \lambda R \quad (1)$$

In Equation (1), D indicates a sum of squared errors between decoded pixels and pixels of an original image, R is a generated bit amount, and $\lambda$ is a Lagrangian parameter. Further, in order to speed up the coding optimization process, there is also a technique in which a pseudo RD cost in which D is replaced with a sum D' of absolute differences between predicted pixels and the pixels of the original image and R is replaced with a generated bit amount R' other than a bit amount of coefficients is used as the coding cost. Hereinafter, the coding cost is assumed to mean a cost as represented by the RD cost or the pseudo RD cost.

Next, an operation of a process for determining an optimal prediction direction of intra-prediction will be described with reference to FIG. 16. FIG. 16 is a flowchart illustrating the operation of the process for determining the optimal prediction direction of the intra-prediction. A process of steps S82 to S85 to be described below is repeatedly performed while a certain prediction direction is selected (step S81). First, an intra-predicted image in the prediction direction is generated using neighboring encoded pixels (step S82). Subsequently, an error between pixels of the intra-predicted image and pixels of the original image is calculated (step S83).

Then, a generated bit amount is calculated (step S84), and a coding cost is calculated from the error and the generated bit amount (step S85). Then, steps S82 to S85 are repeated for each prediction direction. Finally, a direction in which the calculated coding cost is the lowest is set as an intra-prediction direction to thereby set an optimal intra-prediction direction (step S86).

In the coding optimization process, a block having a certain fixed size is divided into sub-blocks having an optimal sub-block size, and an optimal prediction mode is determined for each sub-block. In order to determine the optimal sub-block size and the optimal prediction mode in units of blocks, it is necessary to obtain a coding cost in each prediction mode for each sub-block size, as described above. Particularly, for a determination of the optimal intra-prediction direction, it is necessary to perform decoding on neighboring encoded pixels necessary for generation of a predicted image for each intra-prediction direction. These processes are also performed on a sub-block that does not have an optimal size. However, in this case, a result of decoding the neighboring pixels is used only for comparison of the coding costs.

Particularly, in the case of a determination using a pseudo RD cost, which is one of techniques aiming at speeding up the coding optimization process, it is not necessary to encode a prediction error when calculating R'; however, because a predicted image is used to calculate D', it is necessary to encode and decode neighboring pixels used for the calculation. Therefore, when an optimal coding cost of each sub-block size is determined through only speeding-up using a pseudo RD cost, an actual reduction of the computation process is achieved in only an arithmetic coding process of a prediction error coefficient, and it is necessary to perform a decoding process in which the computational complexity is large for each sub-block size.

It is to be noted that it is assumed that a case in which the generated bit amount is described hereinbelow includes a case in which a generated bit amount of coefficients is included and a case in which the generated bit amount of the coefficients is not included.

Non-Patent Document 1 is an example in which speeding-up using the conventional art is performed. Non-Patent Document 1 introduces a technique in which pixels of an original image or pixels obtained by applying a filter to the pixels of the original image are used as pixels of a pseudo intra-predicted image. With this technique, reference pixels used for calculation of an optimal intra-prediction mode of each size of a sub-block are only the pixels of the original image or the pixels obtained by applying the filter to the pixels of the original image, and thus decoding of neighboring pixels is not necessary and the computational complexity can be reduced.

PRIOR ART DOCUMENTS

Non-Patent Documents

Non-Patent Document 1: Takafumi Bando, Naoyuki Hirai, Tian Song, and Takashi Shimamoto, "New Prediction Modes for Parallel Processing of H.264/AVC", Proceedings of International Conference on Multimedia and Signal Processing (CMSP'11), pp. 344-347, Guilin, China, May 2011.

Non-Patent Document 2: Sakae Okubo, Teruhiko Suzuki, Seishi Takamura, and Takeshi Chujo, "Impress standard textbook series H.265/HEVC textbook", Impress Japan, Oct. 18, 2013.

Non-Patent Document 3: K. McCann, B. Bross, W.-J. Han, I. K. Kim, K. Sugimoto, and G J. Sullivan, "High Efficiency Video Coding (HEVC) Test Model 15 (HM 15) Encoder Description", Joint Collaborative Team on Video Coding (JCT-VC) document JCTVC-Q 1002, March 2014.

SUMMARY OF INVENTION

Problems to be Solved by the Invention

In the technique disclosed in Non-Patent Document 1, pixels of the pseudo intra-predicted image are generated using the pixels of the original image or the pixels obtained by applying a fixed filter to the pixels of the original image as pixels of a reference image of the intra-prediction.

However, when only the pixels of the original image or only the pixels obtained by applying the fixed filter to the pixels of the original image are used, there is a problem in that a quantization step size, a selected prediction mode, and the like, which are considered to have an influence on an original decoded image are not used, and thus correct prediction and correct cost calculation cannot be performed.

The present invention has been made in view of such circumstances, and an object thereof is to provide an image encoding method, an image encoding apparatus, and an image encoding program capable of reducing the computational complexity in intra-prediction of a coding optimization process.

Means for Solving the Problems

An aspect of the present invention is an image encoding apparatus including: a reference pixel generation unit that generates reference pixels from predicted pixels of neighboring pixels and pixels of an original image for intra-prediction directions; a pseudo intra-predicted pixel generation unit that generates pseudo intra-predicted pixels from the reference pixels and the intra-prediction directions; a coding cost calculation unit that calculates coding costs for the intra-prediction directions from errors between the pseudo intra-predicted pixels and the pixels of the original image and generated bit amounts when the pseudo intra-predicted pixels are generated; and an intra-prediction direction setting unit that sets an intra-prediction direction corresponding to the lowest coding cost among the coding costs as an optimal intra-prediction direction.

An aspect of the present invention is an image encoding apparatus including: a skip mode determination unit that determines whether a prediction mode of predicted pixels of neighboring pixels for an intra-prediction direction is a skip mode; an intra-predicted pixel/pseudo intra-predicted pixel generation unit that sets the predicted pixels of the neighboring pixels as reference pixels and generates intra-predicted pixels from the reference pixels if a determination result of the skip mode determination unit is the skip mode, and generates the reference pixels from the predicted pixels of the neighboring pixels and pixels of an original image and generates pseudo intra-predicted pixels from the generated reference pixels and intra-prediction directions if the determination result is a mode other than the skip mode; a coding cost calculation unit that calculates coding costs for intra-prediction directions from errors between the intra-predicted pixels or the pseudo intra-predicted pixels and the pixels of the original image and generated bit amounts when the intra-predicted pixels or the pseudo intra-predicted pixels are generated; and an intra-prediction direction setting unit that sets an intra-prediction direction corresponding to the lowest coding cost among the coding costs as an optimal intra-prediction direction.

An aspect of the present invention is an image encoding apparatus including: a weighting coefficient generation unit that generates weighting coefficients that are used when a pseudo intra-predicted image is generated from a quantization step size of predicted pixels of neighboring pixels for an intra-prediction direction; a pseudo intra-predicted pixel generation unit that generates reference pixels using the weighting coefficients from the predicted pixels of the neighboring pixels and pixels of an original image, and generates pseudo intra-predicted pixels from the reference pixels and intra-prediction directions; a coding cost calculation unit that calculates coding costs for the intra-prediction directions from errors between the pseudo intra-predicted pixels and the pixels of the original image and generated bit amounts when the pseudo intra-predicted pixels are generated; and an intra-prediction direction setting unit that sets an intra-prediction direction corresponding to the lowest coding cost among the coding costs as an optimal intra-prediction direction.

In the image coding apparatuses, a coding cost for an intra-prediction direction set in units of blocks may be compared with a coding cost for a mode other than an intra-prediction mode, and intra-prediction may be performed again using a neighboring decoded image on a block in which the coding cost for the optimal intra-prediction direction is smaller.

An aspect of the present invention is an image encoding method including: a reference pixel generation step of generating reference pixels from predicted pixels of neighboring pixels and pixels of an original image for intra-prediction directions; a pseudo intra-predicted pixel generation step of generating pseudo intra-predicted pixels from the reference pixels and the intra-prediction directions; a coding cost calculation step of calculating coding costs for the intra-prediction directions from errors between the pseudo intra-predicted pixels and the pixels of the original image and generated bit amounts when the pseudo intra-predicted pixels are generated; and an intra-prediction direction setting step of setting an intra-prediction direction corresponding to the lowest coding cost among the coding costs as an optimal intra-prediction direction.

An aspect of the present invention is an image encoding program for causing a computer to execute the image encoding method.

Advantageous Effects of Invention

In accordance with the present invention, it is possible to reduce the computational complexity of encoding. In particular, in accordance with the present invention, an advantageous effect that it is possible to reduce the computational complexity in the intra-prediction of the encoding optimization process can be obtained.

MODES FOR CARRYING OUT THE INVENTION

Figure 1:
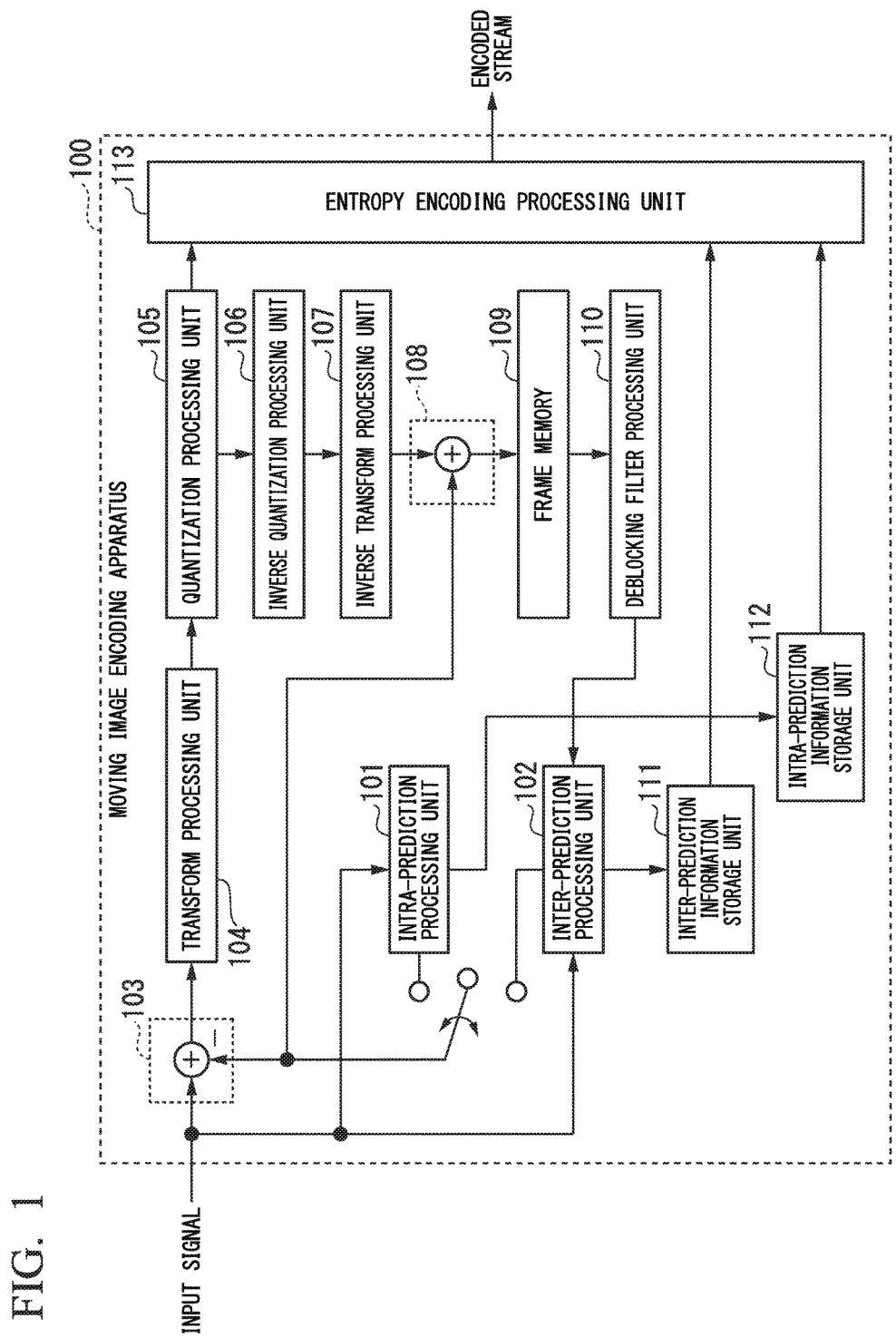
FIG. 1 is a block diagram illustrating a configuration of an image encoding apparatus to which the present invention is applied.

Hereinafter, an image encoding apparatus to which the present invention is applied will be described with reference to the drawings. FIG. 1 is a block diagram illustrating a configuration of the image encoding apparatus to which the present invention is applied. The image encoding apparatus 100 includes an intra-prediction processing unit 101, an inter-prediction processing unit 102, a prediction residual signal generation unit (adding unit) 103, a transform processing unit 104, a quantization processing unit 105, an inverse quantization processing unit 106, an inverse transform processing unit 107, a decoded signal generation unit (adding unit) 108, a frame memory 109, a deblocking filter processing unit 110, an inter-prediction information storage unit 111, an intra-prediction information storage unit 112, and an entropy encoding processing unit 113. Since the configuration of the image encoding apparatus 100 illustrated in FIG. 1 is equivalent to a video encoding process block of the HEVC and is a known configuration as described in Non-Patent Documents 2 and 3, the contents of which are incorporated herein by reference, and a detailed description thereof will be omitted.

Figure 2:
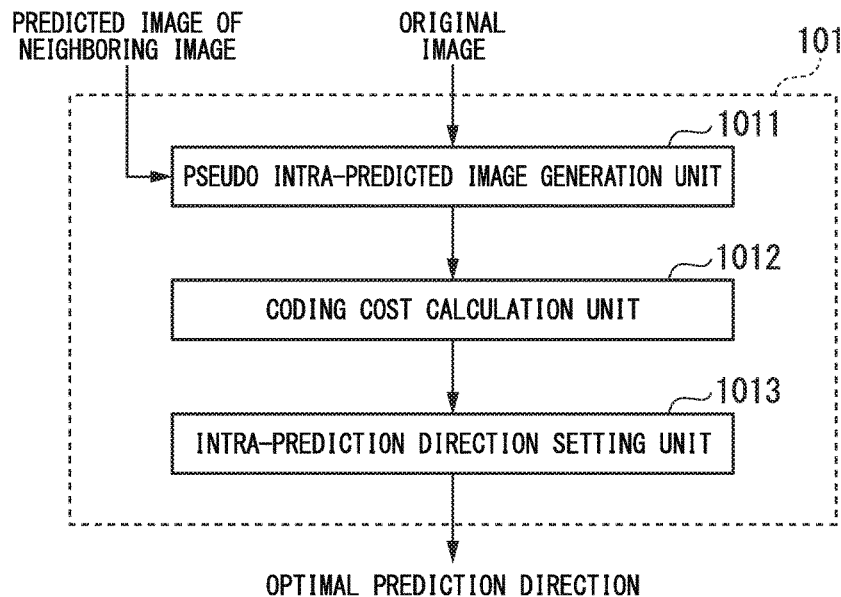
FIG. 2 is a block diagram illustrating a detailed configuration of an intra-prediction processing unit 101 illustrated in FIG. 1.

Next, a detailed configuration of the intra-prediction processing unit 101 illustrated in FIG. 1 will be described with reference to FIG. 2. FIG. 2 is a block diagram illustrating the detailed configuration of the intra-prediction processing unit 101 illustrated in FIG. 1. In FIG. 2, reference numeral 1011 indicates a pseudo intra-predicted image generation unit that generates a pseudo intra-predicted image. Reference numeral 1012 indicates a coding cost calculation unit that calculates a coding cost. Reference numeral 1013 indicates an intra-prediction direction setting unit that sets an intra-prediction direction. The intra-prediction processing unit 101 uses pixels obtained using predicted pixels of neighboring pixels and pixels of an original image, rather than decoded pixels, as reference pixels of intra-prediction.

Figure 3:
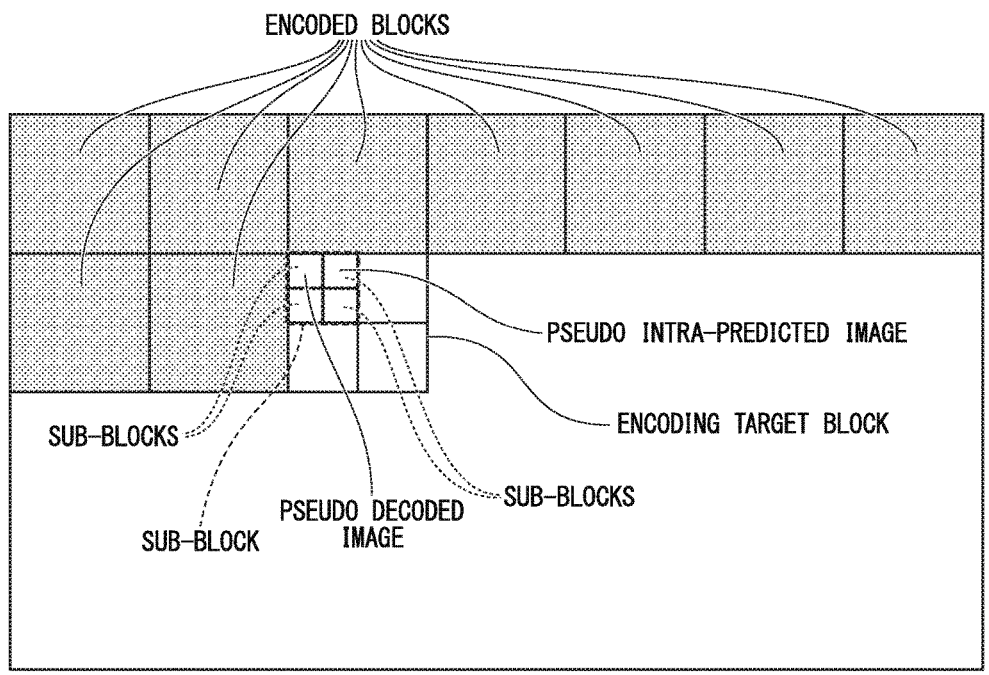
FIG. 3 is a schematic diagram describing a pseudo intra-predicted image and a pseudo decoded image.

Here, a pseudo intra-predicted image and a pseudo decoded image will be described with reference to FIG. 3. FIG. 3 illustrates a case in which a coding cost of a sub-block at the upper left corner in an encoding target block has already been calculated, and a coding cost of a sub-block on the right side thereof is a calculation target. The coding cost of the sub-block at the upper left corner has already been calculated, but a block shape thereof has not been definitely determined, and thus a decoded image is not generated. Therefore, there are no neighboring left decoded pixels used for the intra-prediction. Accordingly, a pseudo decoded image generated from a reference image (corresponding to the "predicted pixels of the neighboring pixels" described above) and the original image (corresponding to "reference pixels" in "reference pixels obtained using the predicted pixels of the neighboring pixels and the pixels of the original image" to be described below) are used, instead of the neighboring left decoded pixels, to generate a pseudo intra-predicted image from the pseudo decoded image and the intra-prediction direction. It is to be noted that an actual decoded image is generated at a timing after shapes of divided blocks of the entire decoding target block are determined (for example, see FIGS. 6 and 10).

First Embodiment

Figure 4:
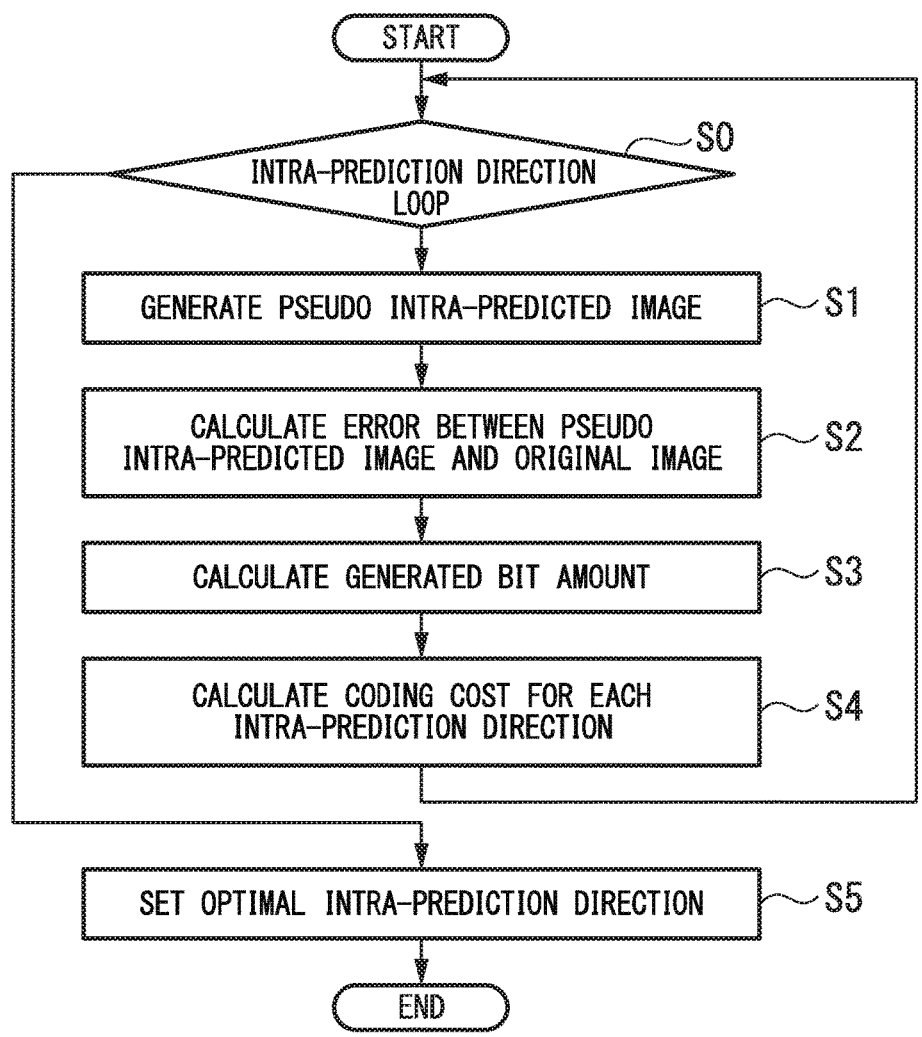
FIG. 4 is a flowchart illustrating an operation of an intra-prediction process using a pseudo decoded image in the intra-prediction processing unit 101 illustrated in FIG. 2.

Next, an operation of an intra-prediction process using a pseudo decoded image in accordance with a first embodiment of the present invention will be described with reference to FIG. 4. FIG. 4 is a flowchart illustrating the operation of the intra-prediction process using the pseudo decoded image in the intra-prediction processing unit 101 illustrated in FIG. 2. The pseudo intra-predicted image generation unit 1011 repeats a process in steps S1 to S4 to be described below while selecting one intra-prediction direction (step S0). First, the pseudo intra-predicted image generation unit 1011 generates pseudo intra-predicted pixels from reference pixels determined using predicted pixels of neighboring pixels and pixels of an original image, and the intra-prediction direction (step S1). For example, the pseudo intra-predicted image generation unit 1011 generates average values of pixel values of the predicted pixels of the neighboring pixels and pixel values of co-located pixels of the original image as pixel values of the reference pixels.

Then, the pseudo intra-predicted image generation unit 1011 calculates an error between the generated pseudo intra-predicted pixels and the pixels of the original image (step S2). The pseudo intra-predicted image generation unit 1011 calculates a generated bit amount resulting from generation of the pseudo intra-predicted pixels (step S3).

Then, the coding cost calculation unit 1012 calculates a coding cost for each intra-prediction direction (step S4). After selecting all the intra-prediction directions, the intra-prediction direction setting unit 1013 then sets the intra-prediction direction in which the coding cost is the lowest as an optimal intra-prediction direction (step S5).

In intra-prediction when a coding optimization process is sped up, decoded pixels is used for calculation of the coding cost, and thus it is necessary to sequentially perform decoding of neighboring pixels in determining an appropriate sub-block size and an appropriate prediction mode. In contrast, in the present embodiment, the pseudo intra-predicted pixels are generated from the reference pixels obtained using the neighboring predicted pixels and the pixels of the original image, rather than the neighboring decoded pixels, and the cost for each prediction direction of intra-prediction is calculated. Accordingly, since an appropriate prediction cost is derived without performing the decoding process, it is possible to realize reduction of the computational complexity while suppressing degradation of coding efficiency in the coding optimization process.

Next, a target for reduction in computation in accordance with the first embodiment will be described with reference to FIGS. 5 and 6.

Figure 5:
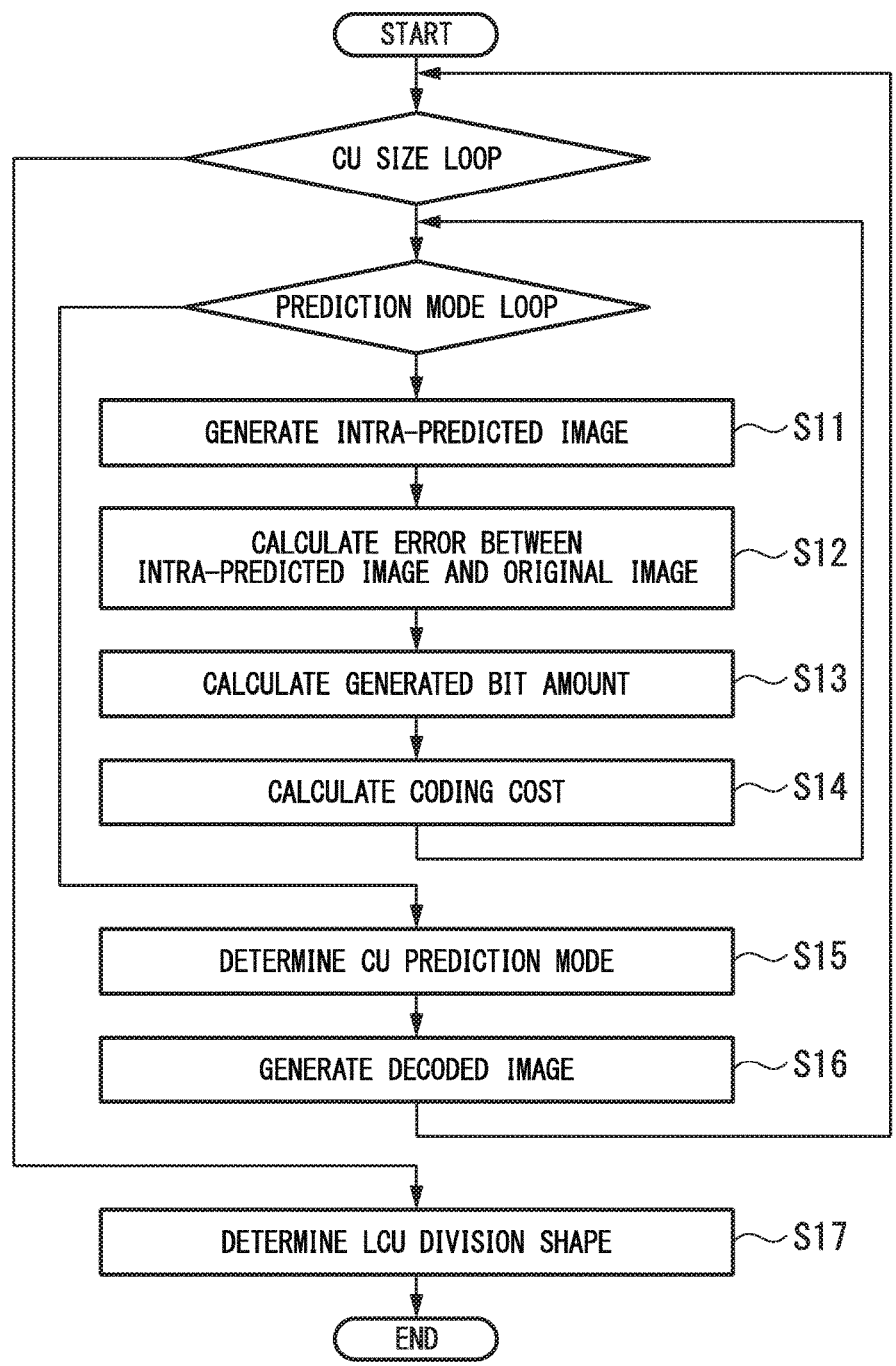
FIG. 5 is a flowchart illustrating an operation of a determination process of CU division and a prediction mode in one LCU in accordance with a conventional process.

FIG. 5 is a flowchart illustrating an operation of a determination process of CU division and a prediction mode in one LCU in the conventional process. First, an intra-predicted image in each prediction mode is generated using neighboring encoded pixels (step S11). Then, an error between pixels of the intra-predicted image and the pixels of the original image is calculated (step S12). Then, a generated bit amount is calculated (step S13), and a coding cost is calculated from the error and the generated bit amount (step S14). Steps S11 to S14 are repeated for all prediction modes. Then, the prediction mode in which the coding cost is the lowest is determined as a prediction mode of each CU size (step S15). Then, a decoded image is generated in accordance with the determined prediction mode (Step S16). Steps S11 to S16 are repeated for all the CU sizes. Finally, a combination of divided CUs in which the coding cost is the lowest is obtained, and an LCU division shape is determined (step S17).

Figure 6:
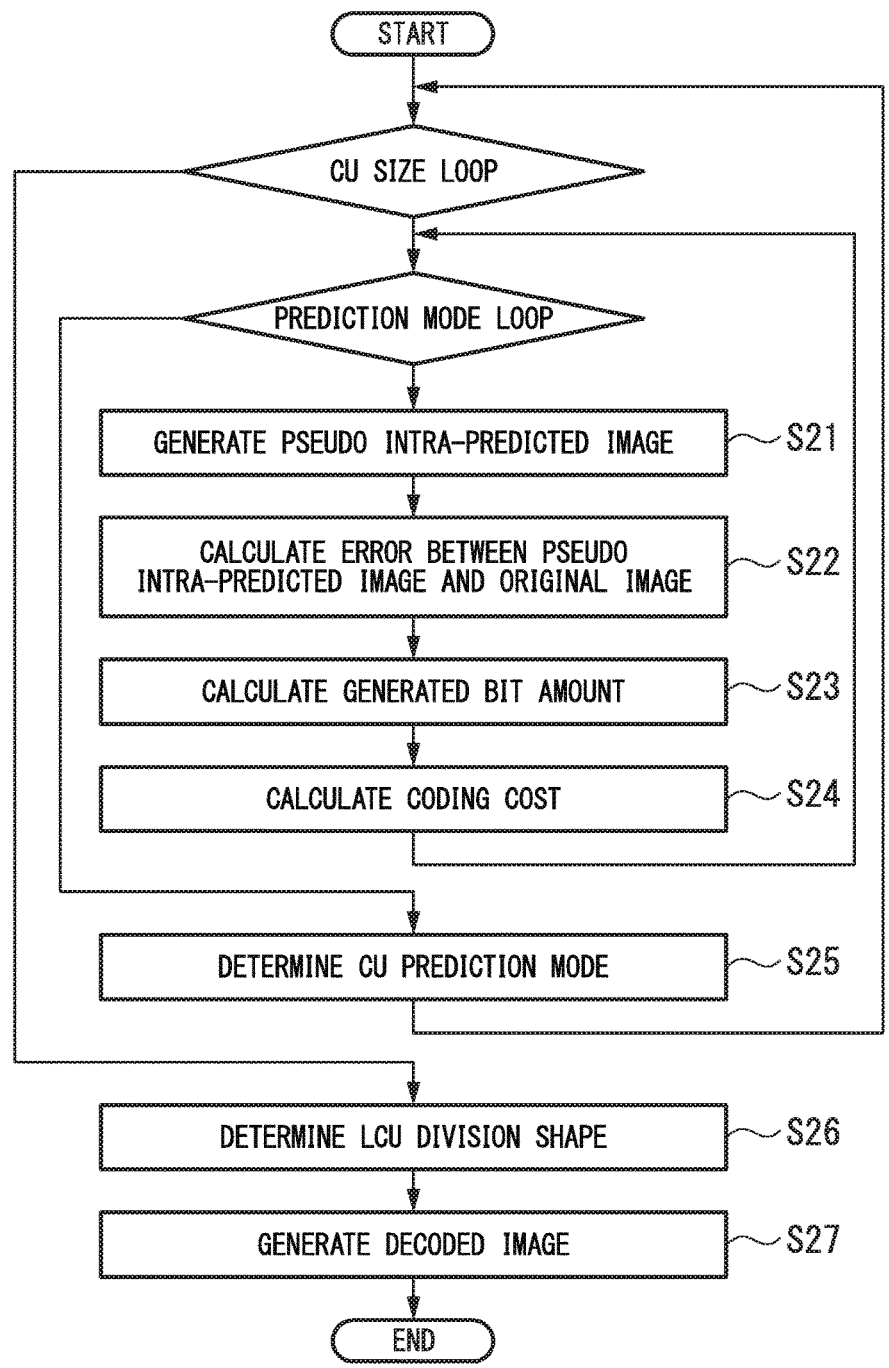
FIG. 6 is a flowchart illustrating an operation of a determination process of CU division and a prediction mode in one LCU in accordance with a first embodiment.

FIG. 6 is a flowchart illustrating an operation of a determination process of CU division and a prediction mode in one LCU in accordance with the present embodiment. First, pseudo intra-predicted pixels in each prediction mode are generated from reference pixels that are obtained using predicted pixels of neighboring pixels and pixels of an original image and a prediction mode (step S21). Then, an error between pixels of a generated pseudo intra-predicted image and the pixels of the original image is calculated (step S22). Then, a generated bit amount is calculated (step S23), and a coding cost is calculated from the error and the generated bit amount (step S24). Steps S21 to S24 are repeated for all the prediction modes. Then, the prediction mode in which the coding cost is the lowest is determined as a prediction mode of each CU size (step S25). Steps S21 to S25 are repeated for all CU sizes. Then, a combination of divided CUs in which the coding cost is the lowest is obtained, and an LCU division shape is determined (step S26). Finally, a decoded image is generated in accordance with the determined LCU division shape (step S27).

In the conventional process, it is necessary to generate decoded pixels for each CU size, as shown in step S16 of FIG. 5. In contrast, in the present embodiment, it is not necessary to use neighboring decoded pixels in each intra-prediction, and thus it is sufficient that generation of decoded pixels be performed only once for one LCU as shown in step S27 of FIG. 6. Accordingly, the computational complexity is reduced.

Second Embodiment

Figure 7:
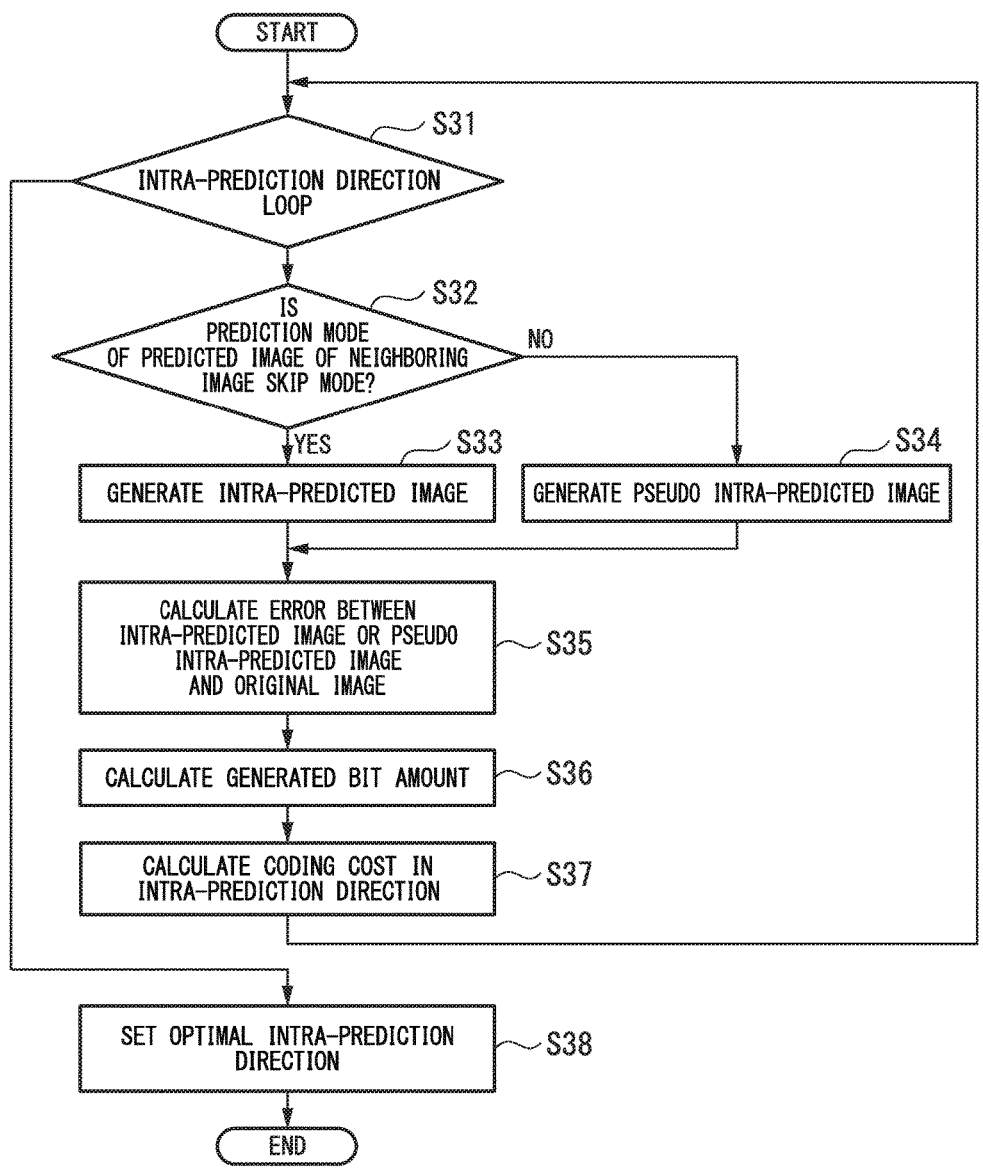
FIG. 7 is a flowchart illustrating an operation of an intra-prediction process using a pseudo decoded image in the intra-prediction processing unit 101 illustrated in FIG. 2.

Next, an operation of an intra-prediction process using a pseudo decoded image in accordance with a second embodiment of the present invention will be described with reference to FIG. 7. FIG. 7 is a flowchart illustrating an operation of the intra-prediction process using the pseudo decoded image in the intra-prediction processing unit 101 illustrated in FIG. 2. In the process illustrated in FIG. 7, when the reference pixels are generated using the predicted pixels of the neighboring pixels and the pixels of the original image, pixels obtained in consideration of a prediction mode of the predicted pixels of the neighboring pixels are used. The pseudo intra-predicted image generation unit 1011 repeats a process in steps S32 to S37 to be described below while selecting one intra-prediction direction (step S31). First, the pseudo intra-predicted image generation unit 1011 determines whether the prediction mode of the predicted pixels of the neighboring pixels is a skip mode (step S32). As a result of this determination, "if the prediction mode of the predicted pixels of the neighboring pixels is a skip mode", the pseudo intra-predicted image generation unit 1011 generates intra-predicted pixels using predicted pixels of the skip mode (step S33).

In contrast, "if the prediction mode of the predicted pixels of the neighboring pixels is a mode other than the skip mode (an intra-prediction mode or an inter-prediction mode)", the pseudo intra-predicted image generation unit 1011 generates pseudo intra-predicted pixels from reference pixels obtained using the predicted pixels of the skip mode and the pixels of the original image, and the intra-prediction direction (step S34). For example, the pseudo intra-predicted image generation unit 1011 generates average values of pixel values of the predicted pixels of the neighboring pixels and pixel values of co-located pixels of the original image as pixel values of the reference pixels.

Then, the pseudo intra-predicted image generation unit 1011 calculates an error between the generated intra-predicted pixels or pseudo intra-predicted pixels and the pixels of the original image (step S35). Then, the pseudo intra-predicted image generation unit 1011 calculates a generated bit amount resulting from the generation of the intra-predicted pixels or the pseudo intra-predicted pixels (step S36).

Then, the coding cost calculation unit 1012 calculates a coding cost for each intra-prediction direction (step S37). Then, the intra-prediction direction setting unit 1013 sets the intra-prediction direction in which the coding cost is the lowest as an optimal intra-prediction direction (step S38).

In the intra-prediction when the coding optimization process is sped up, decoded pixels are used for calculation of the coding cost, and thus it is necessary to sequentially perform decoding of neighboring pixels in determining an appropriate sub-block size and an appropriate prediction mode. In contrast, in the present embodiment, the predicted pixels of the neighboring pixels are switched in accordance with the prediction mode for the neighboring pixels, and the switched pixels are used as the pseudo intra-predicted pixels, instead of using the neighboring decoded pixels. Thus, an appropriate prediction cost is derived without performing the decoding process, and thus it is possible to realize reduction of the computational complexity while suppressing degradation of coding efficiency in the coding optimization process.

It is to be noted that in step S33 (if the prediction mode of the predicted pixels of the neighboring pixels is the skip mode), the predicted pixels of the skip mode are decoded pixels, and thus the predicted image is denoted as an "intra-predicted image" rather than a "pseudo intra-predicted image".

Third Embodiment

Figure 8:
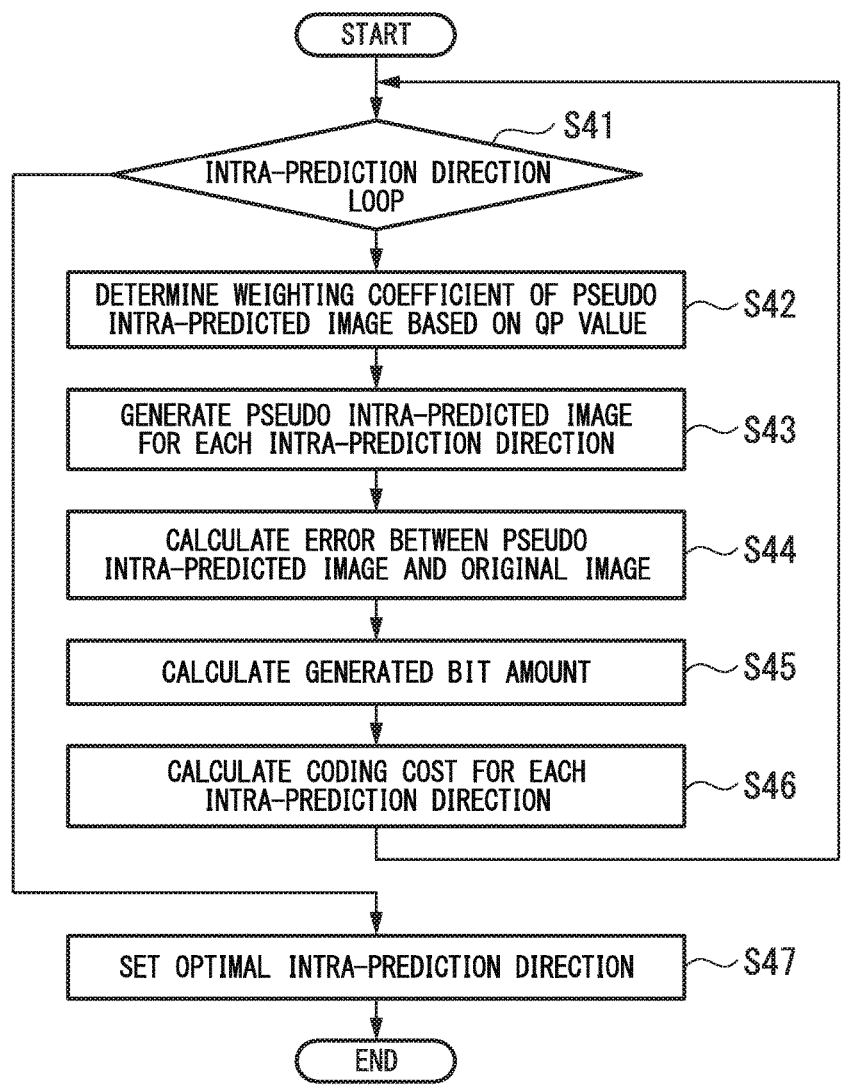
FIG. 8 is a flowchart illustrating an operation of an intra-prediction process using a pseudo decoded image in the intra-prediction processing unit 101 illustrated in FIG. 2.

Next, an operation of an intra-prediction process using a pseudo decoded image in accordance with a third embodiment of the present invention will be described with reference to FIG. 8. FIG. 8 is a flowchart illustrating the operation of the intra-prediction process using the pseudo decoded image in the intra-prediction processing unit 101 illustrated in FIG. 2. The process illustrated in FIG. 8 uses pixels obtained in consideration of a quantization step size of neighboring pixels when predicted pixels of the neighboring pixels and pixels of an original image are used. The pseudo intra-predicted image generation unit 1011 repeats a process in steps S42 to S46 to be described below while selecting one intra-prediction direction (step S41). First, the pseudo intra-predicted image generation unit 1011 determines weighting coefficients of pseudo intra-predicted pixels from the quantization step size of the neighboring pixels (step S42). For example, the weighting coefficients are determined by adjusting the weighting coefficients so that a weight for a predicted pixel of a neighboring pixel is greater than a weight for a pixel of the original image when the quantization step size is large. Further, the weighting coefficients are determined by adjusting the weighting coefficients so that a weight for a pixel of the original image is greater than a weight for a predicted pixel of a neighboring pixel when the quantization step size is small.

Then, the pseudo intra-predicted image generation unit 1011 generates reference pixels from the predicted pixels of the neighboring pixels and the pixels of the original image using the weighting coefficients, and generates the pseudo intra-predicted pixels for each intra-prediction direction from the generated reference pixels and the intra-prediction direction (step S43). Subsequently, the pseudo intra-predicted image generation unit 1011 calculates an error between the generated pseudo intra-predicted pixels and the pixels of the original image (step S44). Then, the pseudo intra-predicted image generation unit 1011 calculates a generated bit amount resulting from the generation of the pseudo intra-predicted pixels (step S45).

Then, the coding cost calculation unit 1012 calculates a coding cost for each intra-prediction direction (step S46). Then, the intra-prediction direction setting unit 1013 sets the intra-prediction direction in which the coding cost is the lowest as an optimal intra-prediction direction (step S47).

In the intra-prediction when the coding optimization process is sped up, the decoded pixels are used for calculation of the coding cost, and thus it is necessary to sequentially perform decoding of the neighboring pixels in determining an appropriate sub-block size and an appropriate prediction mode. In contrast, in the present embodiment, the pseudo intra-predicted pixels are derived from the reference pixels obtained as a weighted sum of the neighboring predicted pixels and the pixels of the original image based on the quantization step size of the neighboring decoded pixels, rather than the neighboring decoded pixels, and the intra-prediction direction, and are used. Accordingly, since an appropriate coding cost is derived without performing the decoding process, it is possible to realize reduction of the computational complexity while suppressing degradation of coding efficiency in the coding optimization process.

Fourth Embodiment

Figure 9:
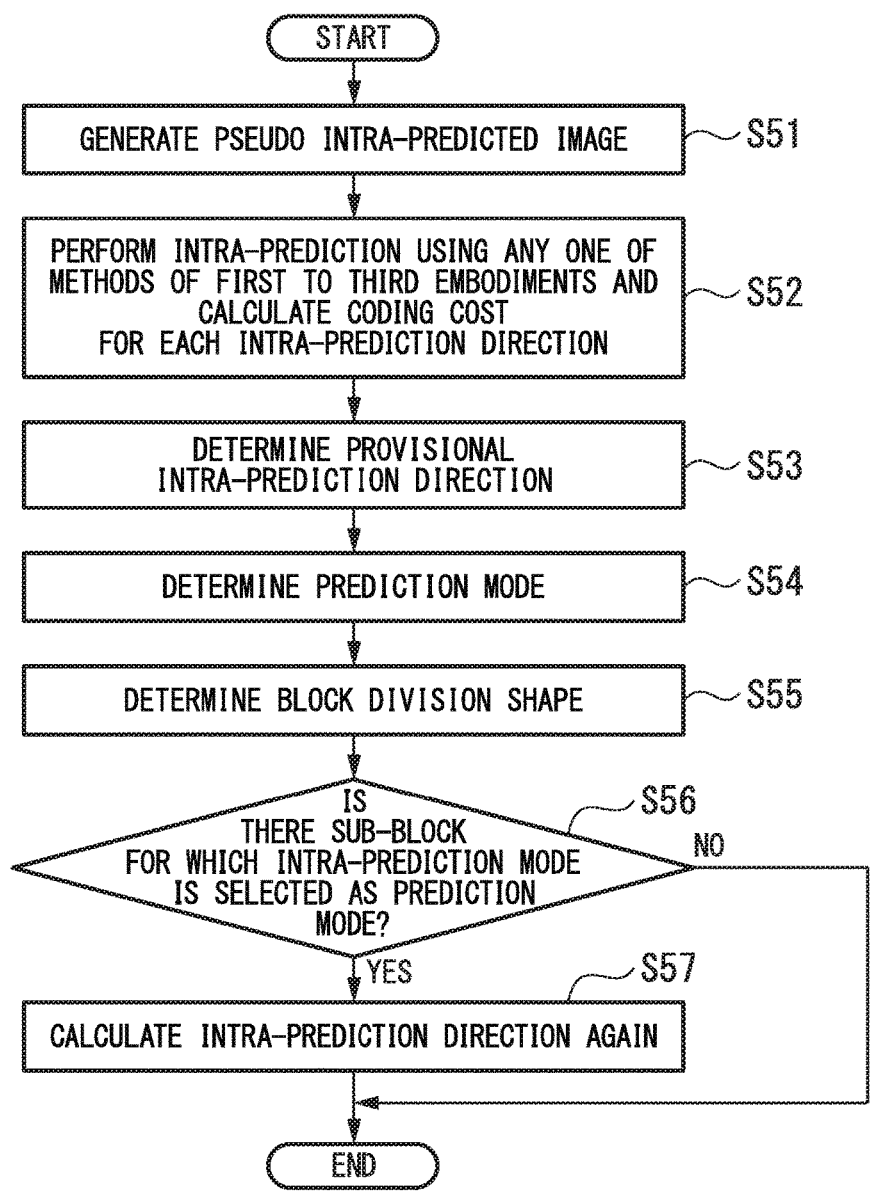
FIG. 9 is a flowchart illustrating an operation of a process of calculating a correct direction of intra-prediction in an intra-prediction direction setting unit 1013 illustrated in FIG. 2

Next, an operation of a process of calculating a correct direction of intra-prediction in accordance with a fourth embodiment of the present invention will be described with reference to FIG. 9. FIG. 9 is a flowchart illustrating the operation of the process of calculating the correct direction of the intra-prediction in the intra-prediction direction setting unit 1013 illustrated in FIG. 2. In the process illustrated in FIG. 9, the pseudo intra-predicted pixels and the coding cost thereof calculated in the first to third embodiments are used only for a determination of the prediction mode, and if the optimal prediction mode of a sub-block is an intra-prediction mode, the correct direction of intra-prediction is calculated using original decoded pixels as reference pixels again after a sub-block size is definitely determined. First, the pseudo intra-predicted image generation unit 1011 generates pseudo intra-predicted pixels from reference pixels obtained using predicted pixels of neighboring pixels and pixels of an original image, and an intra-prediction direction (step S51). Subsequently, the coding cost calculation unit 1012 calculates a coding cost for each intra-prediction direction based on the generated pseudo intra-predicted pixels (step S52).

Then, the intra-prediction direction setting unit 1013 sets a direction in which the coding cost is the lowest as a provisional intra-prediction direction (step S53). The intra-prediction direction setting unit 1013 compares coding costs for prediction modes to determine the prediction mode (step S54). Then, the intra-prediction direction setting unit 1013 determines shapes of divided blocks (step S55).

Then, the intra-prediction direction setting unit 1013 determines whether there is a sub-block for which the intra-prediction mode is selected as the prediction mode (step S56). If there is a sub-block for which the intra-prediction mode is selected as the prediction mode, the intra-prediction direction setting unit 1013 calculates actual decoded pixels for only the sub-block, performs the intra-prediction again, and stores its result as the intra-prediction direction of the sub-block (step S57).

In the intra-prediction when the coding optimization process is sped up, the decoded pixels are used for calculation of the coding cost, and thus it is necessary to sequentially perform decoding of neighboring pixels in determining an appropriate sub-block size and an appropriate prediction mode. In contrast, in the present embodiment, the pseudo intra-predicted pixels are derived from the reference pixels obtained using the neighboring predicted pixels and the pixels of the original image and the intra-prediction direction, rather than the neighboring decoded pixels, and are used to determine the sub-block size and the optimal prediction mode. Accordingly, an appropriate coding cost is derived without performing the decoding process. Further, in the present embodiment, after the sub-block size is determined, calculation of the intra-prediction direction is performed again on only the sub-block in which the intra-prediction is optimal. Accordingly, it is possible to perform more appropriate intra-prediction without increasing an unnecessary decoding process. Thus, in the present embodiment, it is possible to realize improvement of coding efficiency while suppressing an increase in the computational complexity of coding, compared to the processes of the first to third embodiments.

Figure 10:
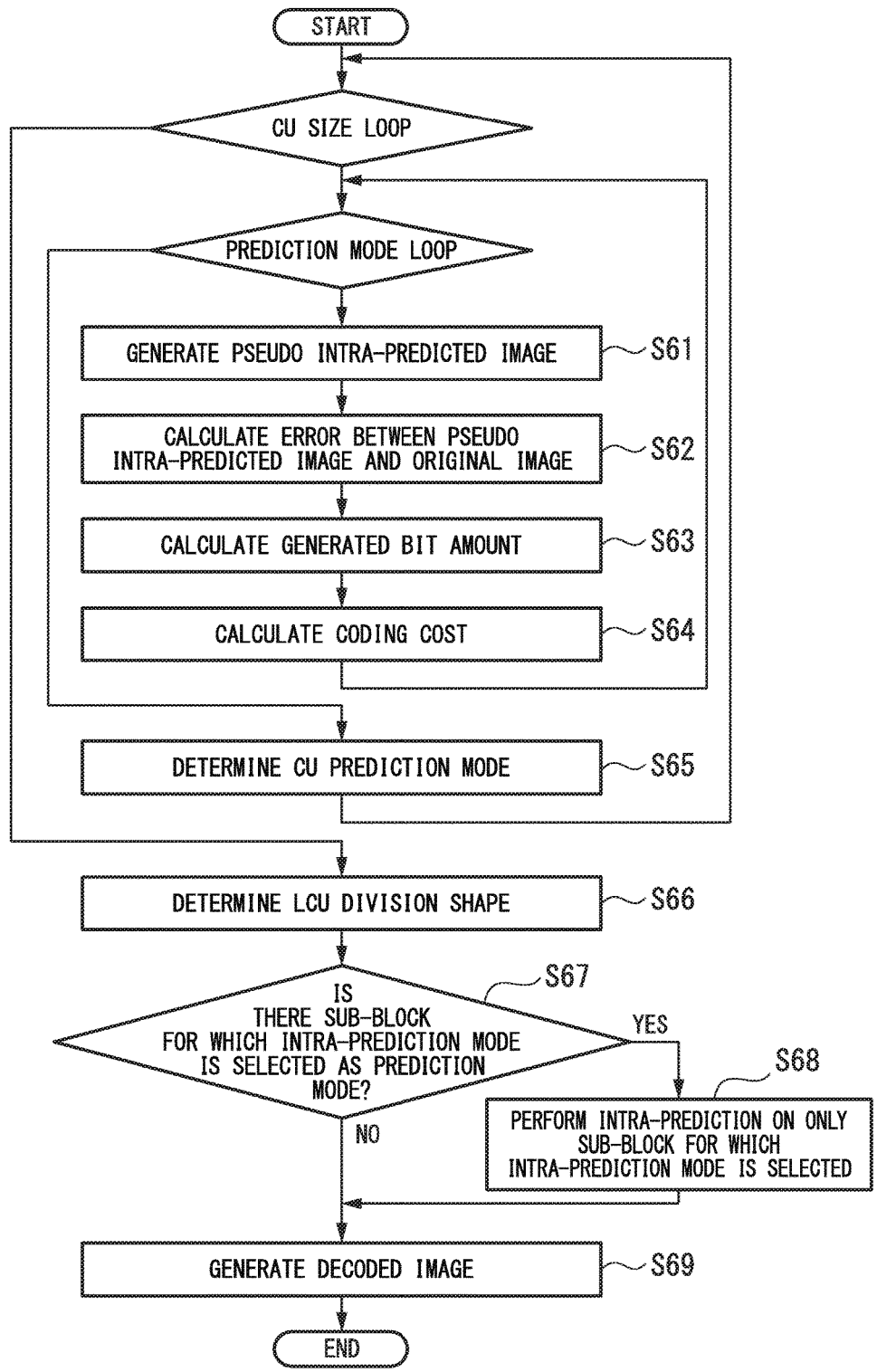
FIG. 10 is a flowchart illustrating an operation of a determination process of CU division and a prediction mode in one LCU in accordance with a fourth embodiment.
Figure 11:
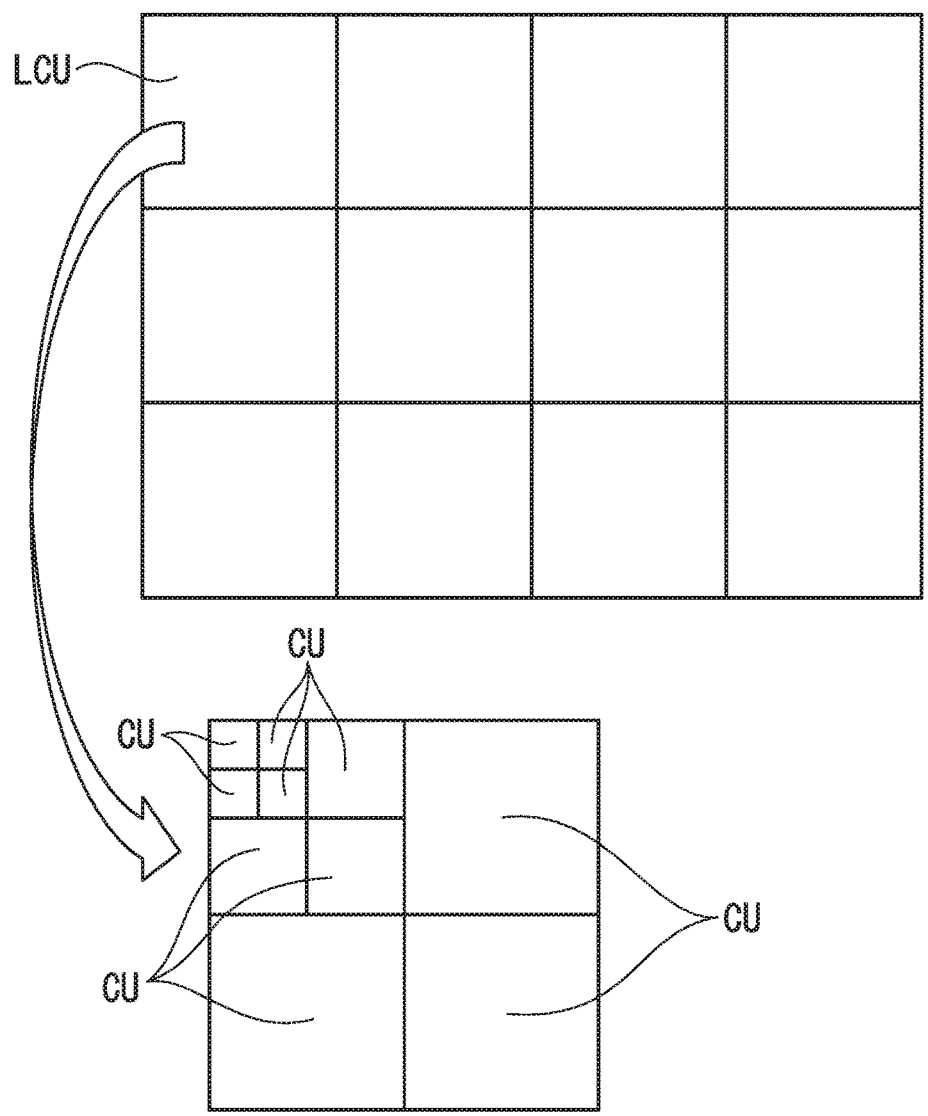
FIG. 11 is a diagram illustrating an example of division of a picture (image).
Figure 12A:
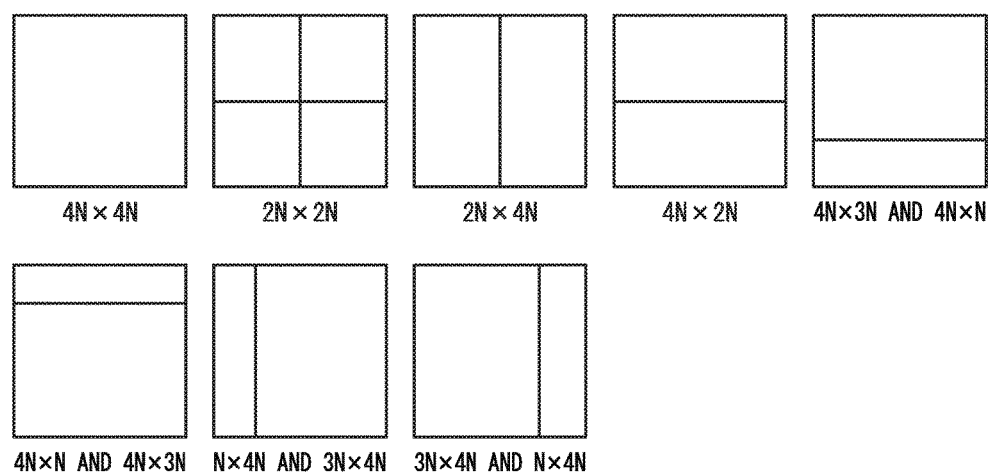
FIG. 12A is a diagram illustrating an example of options of division into PUs.
Figure 12B:
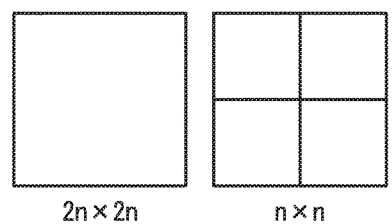
FIG. 12B is a diagram illustrating an example of options of division into PUs.

A difference between the fourth embodiment and the first to third embodiments will be described with reference to FIGS. 6 and 10. FIG. 10 is a flowchart illustrating an operation of a determination process of CU division and a prediction mode in one LCU in the fourth embodiment. It is to be noted that a process in steps S61 to S66, and S69 is the same as that in steps S21 to S27 illustrated in FIG. 6. Since an intra-prediction result for determining the optimal prediction mode, the division shape, and the division size is used as it is in the first to third embodiments, there is a possibility that an appropriate intra-prediction direction is not selected when the optimal prediction mode for a sub-block is an intra-prediction mode. However, in the fourth embodiment, after the shapes of the divided blocks are determined, it is determined whether or not there is a sub-block for which the intra-prediction mode is selected as the prediction mode (step S67), and only if the optimal prediction mode is the intra-prediction mode, the intra-prediction direction is obtained using the decoded pixels again, as in step S68 of FIG. 10. Therefore, in the fourth embodiment, it is possible to perform more appropriate intra-prediction while suppressing an increase in the computational complexity of coding, compared to the first to third embodiments.

Figure 13:
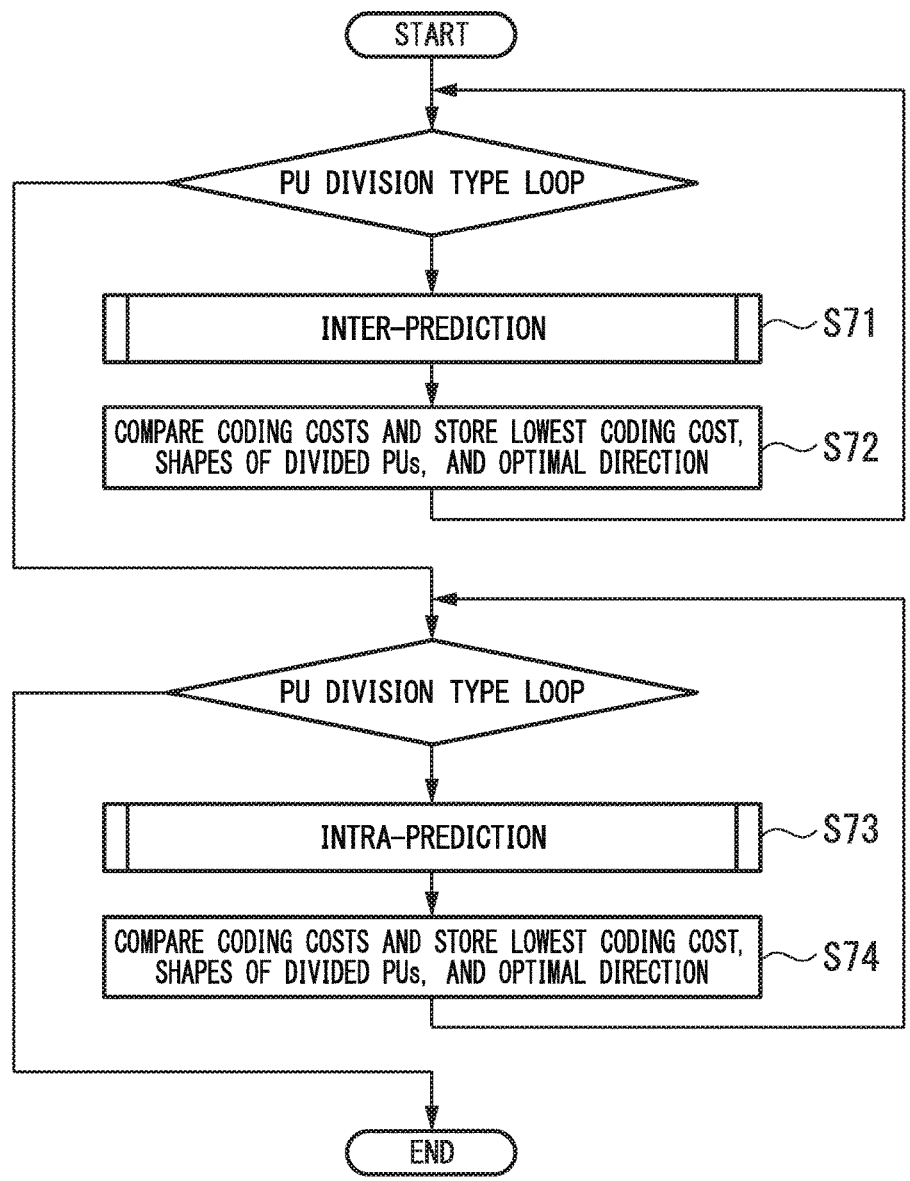
FIG. 13 is a flowchart illustrating an operation of a coding cost calculation process for a determination of shapes of divided PUs in one CU.
Figure 14:
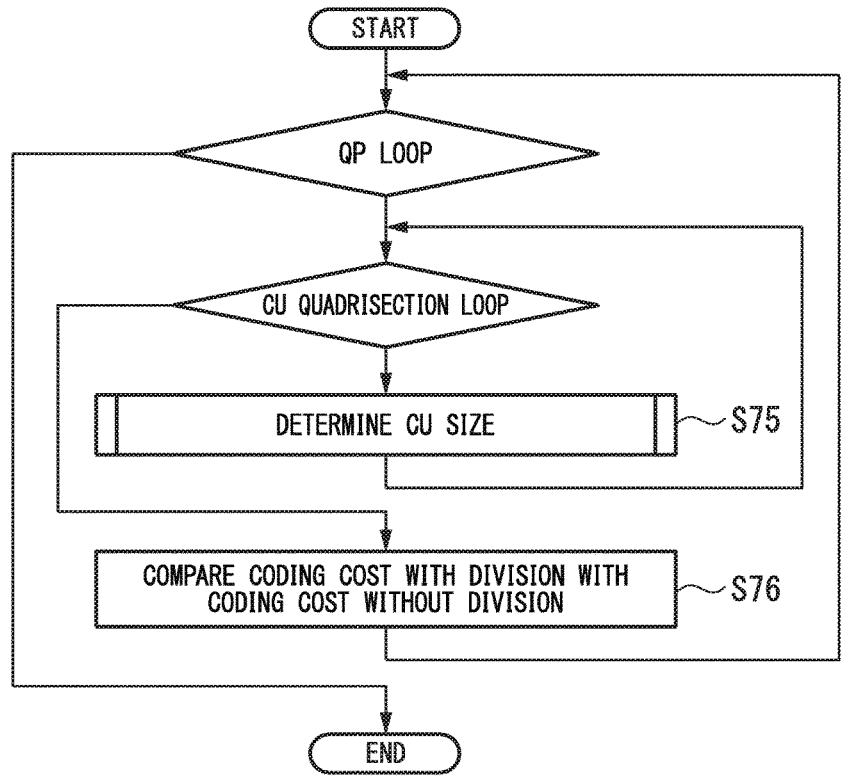
FIG. 14 is a flowchart illustrating an operation of a coding cost calculation process for a determination of a CU division size in one LCU.
Figure 15:
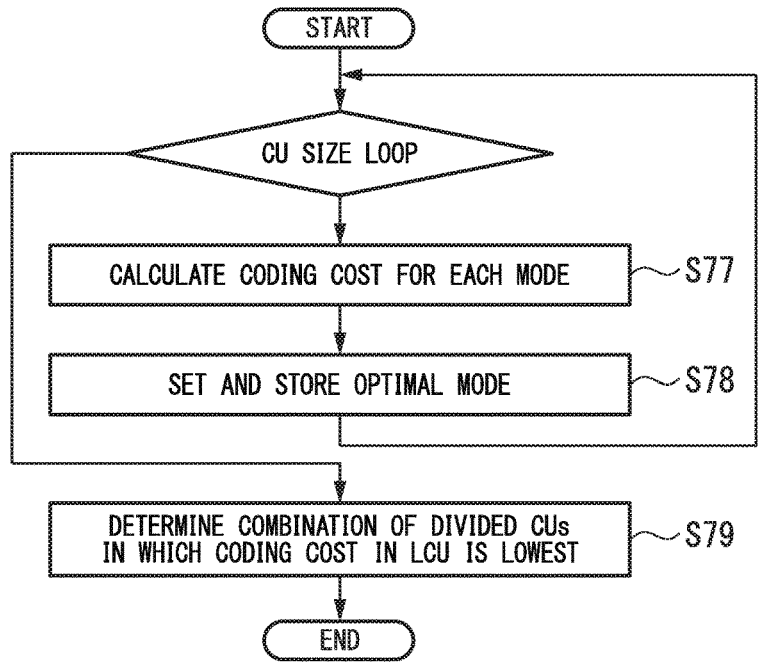
FIG. 15 is a flowchart illustrating an operation of a coding optimization process.
Figure 16:
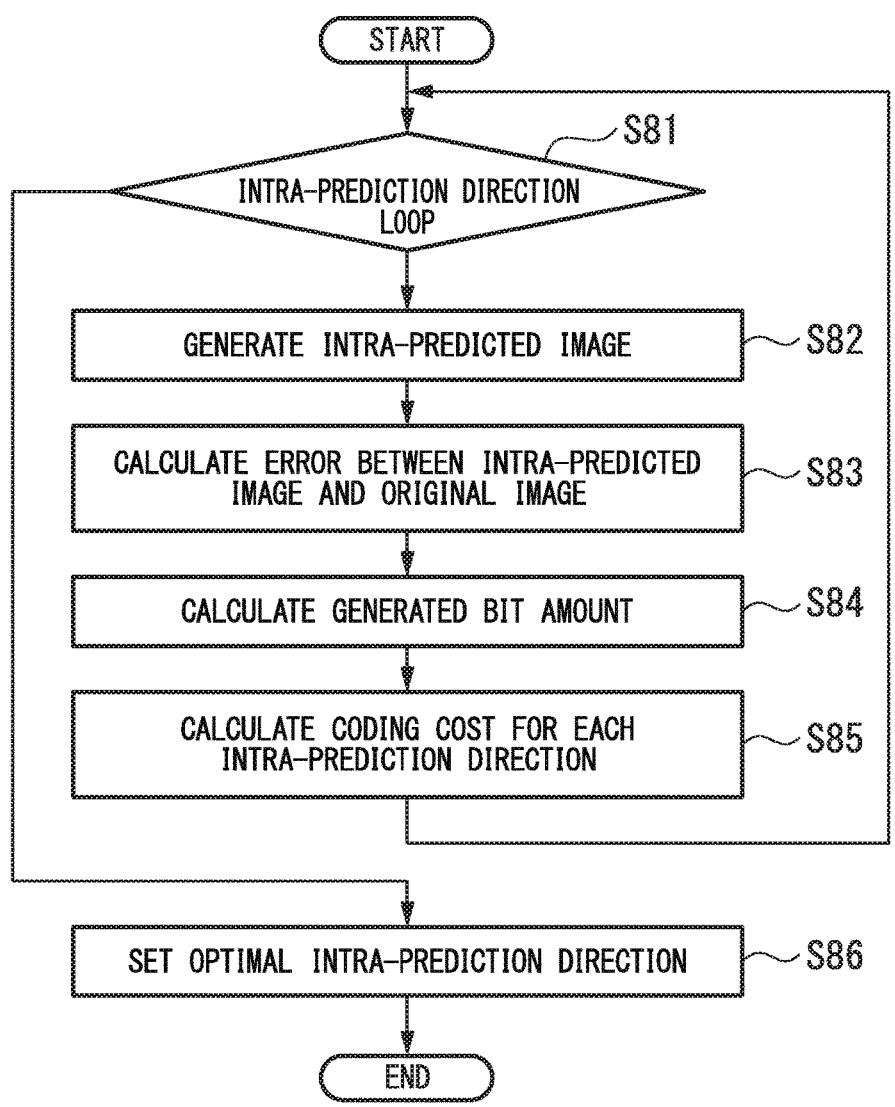
FIG. 16 is a flowchart illustrating an operation of a process for determining an optimal prediction direction of intra-prediction.

Next, an example of a case in which a combination of the first embodiment and the second embodiment is applied to the process operation illustrated in FIG. 13 will be described. First, an input image is divided into LCUs of 64×64 pixels (hereinafter, 64×64 LCUs) (process 1). Then, coding costs for prediction modes including the inter-prediction mode and the skip mode are calculated for a CU having an N×N size at the upper left corner in the upper left LCU using an encoded frame, and the mode in which the coding cost is the lowest and its coding cost C1 are stored (process 2).

Then, in order to obtain a coding cost in intra-prediction of the CU having an N×N size, reference pixels are generated in accordance with a prediction mode for neighboring pixels thereof (process 3). Then, if the prediction mode for the neighboring pixels is a skip mode, a filter in accordance with the direction of the intra-prediction is applied to predicted pixels of the neighboring pixels to generate intra-predicted pixels of the encoding target CU (process 3-1). In contrast, if the prediction mode for the neighboring pixels is a mode other than the skip mode, average values of the predicted pixels of the neighboring pixels and co-located pixels of the original image are calculated to obtain the reference pixels, and a filter in accordance with the direction of the intra-prediction is applied to pixel values thereof to generate pseudo intra-predicted pixels of the encoding target CU (process 3-2).

Then, process 3 is performed for each intra-prediction direction, the lowest coding cost C2 is compared with the coding cost C1, the intra-prediction direction and the coding cost are stored if the coding cost C2 is smaller, and the coding cost C1 is directly stored as the coding cost C2 if the coding cost C1 is smaller (process 4). That is, a loop process progresses so that a minimum value is stored as the coding cost C2.

Processes 2 to 4 are repeatedly performed for the CU sizes 8×8 to 64×64, and the optimal prediction modes and their coding costs are calculated for the CUs having all sizes in the upper left LCU (process 5). Then, a coding cost of a CU of 16×16 pixels (hereinafter, a 16×16 CU) at the upper left corner is compared with a sum of coding costs of four CUs of 8×8 pixels (hereinafter, 8×8 CUs) therein, the CU of which the coding cost is smaller is selected as the optimal CU, and CU division information, and the prediction mode and the coding cost of each CU are stored (process 6). Process 6 is then repeated for each 16×16 CU (process 7).

Then, a coding cost of a CU of 32×32 pixels (hereinafter, a 32×32 CU) at the upper left corner is compared with a sum of coding costs of four 16×16 CUs therein. In this case, the coding cost of the optimal CU selected in process 6 is used as the coding cost of the 16×16 CUs. The CU of which the coding cost is smaller is selected as the optimal CU based on the result of the comparison, and CU division information, and the prediction mode and the coding cost of each CU are stored (process 8). Process 8 is repeated for each 32×32 CU (process 9).

Then, a coding cost of a CU of 64×64 pixels (hereinafter, a 64×64 CU) is compared with a sum of coding costs of four 32×32 CUs therein. In this case, the coding cost of the optimal CU selected in process 8 is used as the coding cost of the 32×32 CUs. The CU of which the coding cost is smaller is selected as the optimal CU based on the result of the comparison, and CU division information, and the prediction mode and the coding cost of each CU are stored (process 10). Then, processes 2 to 10 are repeated for each LCU (process 11).

Next, an example of a case in which a combination of the second embodiment and the third embodiment is applied to the process operation illustrated in FIG. 13 will be described. First, an input image is divided into 64×64 LCUs (process 21). Then, coding costs for prediction modes including the inter-prediction mode and the skip mode are calculated for a CU having an N×N size at the upper left corner in the upper left LCU using an encoded frame, and the mode in which the coding cost is the lowest and its coding cost C1 are stored (process 22).

Then, in order to obtain a coding cost in intra-prediction of the CU having an N×N size, reference pixels are generated in accordance with a prediction mode for neighboring pixels (process 23). If the prediction mode for the neighboring pixels is a skip mode, a filter in accordance with the direction of the intra-prediction is applied to predicted pixels of the neighboring pixels to generate intra-predicted pixels of the encoding target CU (process 23-1). In contrast, if the prediction mode for the neighboring pixels is a mode other than the skip mode, a weighted sum based on a quantization step size of the neighboring pixels is calculated for the predicted pixels of the neighboring pixels and co-located pixels of the original image to obtain the reference pixels, and a filter in accordance with the direction of the intra-prediction is applied to their pixel values to generate pseudo intra-predicted pixels of the encoding target CU (process 23-2). A method for calculating the weighted sum is as follows.

If the prediction mode for the neighboring pixels is the intra-prediction mode, $$P(x,y)=(1-(\alpha-1)/(N-1)\times\tfrac{1}{2})O(x,y)+((\alpha-1)/(N-1)\times\tfrac{1}{2})\times R(x,y)$$

If the prediction mode for the neighboring pixels is the inter-prediction mode, $$P(x,y)=(1-(\alpha-1)/(N-1)\times\tfrac{2}{3})O(x,y)+((a-1)/(N-1)\times\tfrac{2}{3})\times R(x,y)$$

Here,
O(x, y): The pixel of the original image
R(x, y): The reference pixel
P(x, y): The pseudo intra-predicted pixel
α: The quantization step size (=1, . . . , N)
N: A maximum value of the quantization step size.

Process 23 is performed for each intra-prediction direction, the lowest coding cost C2 is compared with the coding cost C1, the intra-prediction direction and the coding cost are stored if the coding cost C2 is smaller, and the coding cost C1 is directly stored as the coding cost C2 if the coding cost C1 is smaller (process 24). Processes 22 to 24 are repeatedly performed for CU sizes 8×8 to 64×64, and the optimal prediction mode and its coding cost are calculated for the CUs having all sizes in the upper left LCU (process 25).

Then, a coding cost of a 16×16 CU at the upper left corner is compared with a sum of coding costs of four 8×8 CUs therein, the CU of which the coding cost is smaller is selected as the optimal CU, and CU division information, and the prediction mode and the coding cost of each CU are stored (process 26). Then, process 26 is repeated for each 16×16 CU (process 27). Then, a coding cost of a 32×32 CU at the upper left corner is compared with a sum of coding costs of four 16×16 CUs therein. In this case, the coding cost of the optimal CU selected in process 26 is used as the coding cost of the 16×16 CUs. The CU of which the coding cost is smaller is selected as the optimal CU based on the result of the comparison, and CU division information, and the prediction mode and the coding cost of each CU are stored (process 28). Then, process 28 is repeated for each 32×32 CU (process 29).

Then, a coding cost of a 64×64 CU is compared with a sum of coding costs of four 32×32 CUs therein. In this case, the coding cost of the optimal CU selected in process 28 is used as the coding cost of the 32×32 CUs. The CU of which the coding cost is smaller is selected as the optimal CU based on the result of the comparison, and CU division information, and the prediction mode and the coding cost of each CU are stored (process 30). Then, processes 22 to 30 are repeated for each LCU (process 31).

Next, an example of a case in which a combination of the second embodiment, the third embodiment, and the fourth embodiment is applied to the process operation illustrated in FIG. 13 will be described. First, an input image is divided into 64×64 LCUs (process 41). Then, coding costs for prediction modes including the inter-prediction mode and the skip mode are calculated for a CU having an N×N size at the upper left corner in the upper left LCU using an encoded frame, and the mode in which the coding cost is the lowest and its coding cost C1 are stored (process 42).

Then, in order to obtain a coding cost in intra-prediction of the CU having an N×N size, reference pixels are generated in accordance with a prediction mode for neighboring pixels (process 43). If the prediction mode for the neighboring pixels is a skip mode, a filter in accordance with the direction of the intra-prediction is applied to the predicted pixels of the neighboring pixels to generate intra-predicted pixels of the encoding target CU (process 43-1). In contrast, if the prediction mode for the neighboring pixels is a mode other than the skip mode, a weighted sum based on a quantization step size of the neighboring pixels is calculated for predicted pixels of the neighboring pixels and co-located pixels of the original image to obtain the reference pixels, and a filter in accordance with the direction of the intra-prediction is applied to their pixel values to generate pseudo intra-predicted pixels of the encoding target CU (process 43-2). A method for calculating the weighted sum is as follows.

If the prediction mode for the neighboring pixels is the intra-prediction mode, $$P(x,y)=(1-(\alpha-1)/(N-1)\times\tfrac{1}{2})O(x,y)+((\alpha-1)/(N-1)\times\tfrac{1}{2})\times R(x,y)$$

If the prediction mode for the neighboring pixels is the inter-prediction mode, $$P(x,y)=(1-(\alpha-1)/(N-1)\times\tfrac{2}{3})O(x,y)+((\alpha-1)/(N-1)\times\tfrac{2}{3})\times R(x,y)$$

Here, $O(x, y)$: The pixel of the original image
$R(x, y)$: The reference pixel
$P(x, y)$: The pseudo intra-predicted pixel
$\alpha$: The quantization step size ($=1, \ldots, N$)
$N$: A maximum value of the quantization step size.

Then, process 43 is performed for each intra-prediction direction, the lowest coding cost C2 is compared with the coding cost C1, the intra-prediction direction and the coding cost are stored if the coding cost C2 is smaller, and the coding cost C1 is directly stored as the coding cost C2 if the coding cost C1 is smaller (process 44). Processes 42 to 44 are repeatedly performed for CU sizes 8×8 to 64×64, and the optimal prediction modes and their coding costs are calculated for the CUs having all sizes in the upper left LCU (process 45).

Then, a coding cost of a 16×16 CU at the upper left corner is compared with a sum of coding costs of four 8×8 CUs therein, the CU of which the coding cost is smaller is selected as the optimal CU, and CU division information, and the prediction mode and the coding cost of each CU are stored (process 46). Then, process 46 is repeated for each 16×16 CU (process 47).

Then, a coding cost of a 32×32 CU at the upper left corner is compared with a sum of coding costs of four 16×16 CUs therein. In this case, the coding cost of the optimal CU selected in process 46 is used as the coding cost of the 16×16 CUs. The CU of which the coding cost is smaller is selected as the optimal CU based on the result of the comparison, and CU division information, and the prediction mode and the coding cost of each CU are stored (process 48). Then, process 48 is repeated for each 32×32 CU (process 49).

Then, a coding cost of a 64×64 CU is compared with a sum of coding costs of four 32×32 CUs therein. In this case, the coding cost of the optimal CU selected in process 48 is used as the coding cost of the 32×32 CUs. The CU of which the coding cost is smaller is selected as the optimal CU based on the result of the comparison, and CU division information, and the prediction mode and the coding cost of each CU are stored (process 50).

Then, if a CU in which the intra-prediction mode is the optimal prediction mode is included in the finally stored CUs in the LCU, decoding of neighboring pixels is sequentially performed using a fixed division size and mode of the CU, and the optimal intra-prediction direction is obtained again and stored only for a location of the intra-prediction (process 51). Then, processes 42 to 51 are repeated for each LCU.

As described above, it is possible to reduce the computational complexity required for intra-prediction by calculating the coding cost for the pseudo intra-predicted image generated from the reference pixels obtained using the predicted pixels of the neighboring pixels and the pixels of the original image, rather than the neighboring decoded pixels, and the intra-prediction direction, and determining the optimal prediction direction based on the coding cost.

The intra-prediction processing unit 101 in the embodiments described above may be realized by a computer. In this case, the intra-prediction processing unit 101 may be realized by recording a program for realizing the functions thereof on a computer-readable recording medium, loading the program recorded in the recording medium to the computer, and executing the program. It is to be noted that "the computer system" stated herein includes an operating system (OS) and hardware such as peripheral devices. Further, the "computer-readable recording medium" includes a portable medium such as a flexible disk, a magneto-optical disc, a read only memory (ROM), and a compact disc (CD)-ROM, and a storage apparatus such as a hard disk built in a computer system. Further, the "computer-readable recording medium" may also include a recording medium that dynamically holds a program for a short period of time, such as a communication line when the program is transmitted over a network such as the Internet or a communication line such as a telephone line and a recording medium that holds a program for a certain period of time, such as a volatile memory inside a computer system which functions as a server or a client in such a case. Further, the program may be a program for realizing part of the above-described functions or may be a program capable of realizing the above-described functions in combination with a program previously stored in the computer system. Further, the intra-prediction processing unit 101 may be realized using hardware such as a programmable logic device (PLD) or a field programmable gate array (FPGA).

While embodiments of the present invention have been described above with reference to the drawings, it is obvious that the embodiments are only examples of the present invention and the present invention is not limited to the embodiments. Accordingly, additions, omissions, substitutions, and other modifications of the structural components may be performed without departing from the technical concept and scope of the present invention.

INDUSTRIAL APPLICABILITY

The present invention is applicable to applications which reduce the computational complexity necessary for intra-prediction by calculating the coding cost for the pseudo intra-predicted image generated from the reference pixels obtained using the predicted pixels of the neighboring pixels and the pixels of the original image, rather than the neighboring decoded pixels, and the intra-prediction direction, and determining the optimal prediction direction based on the coding cost.

DESCRIPTION OF REFERENCE SIGNS

101 Intra-prediction processing unit
1011 Pseudo intra-predicted image generation unit 1012 Coding cost calculation unit
1013 Intra-prediction direction setting unit

The invention claimed is:

1. An image encoding apparatus comprising:
a skip mode determination unit that determines whether a prediction mode of predicted pixels of neighboring pixels for an intra-prediction direction is a skip mode;
an intra-predicted pixel/pseudo intra-predicted pixel generation unit that sets the predicted pixels of the neighboring pixels as reference pixels and generates intra-predicted pixels from the reference pixels if a determination result of the skip mode determination unit is the skip mode, and generates the reference pixels from the predicted pixels of the neighboring pixels and pixels of an original image and generates pseudo intra-predicted pixels from the generated reference pixels and intra-prediction directions if the determination result is a mode other than the skip mode;
a coding cost calculation unit that calculates coding costs for intra-prediction directions from errors between the intra-predicted pixels or the pseudo intra-predicted pixels and the pixels of the original image and generated bit amounts when the intra-predicted pixels or the pseudo intra-predicted pixels are generated; and
an intra-prediction direction setting unit that sets an intra-prediction direction corresponding to the lowest coding cost among the coding costs as an optimal intra-prediction direction.

2. The image encoding apparatus according to claim 1, wherein a coding cost for an intra-prediction direction set in units of blocks is compared with a coding cost for a mode other than an intra-prediction mode, and intra-prediction is performed again using a neighboring decoded image on a block in which the coding cost for the optimal intra-prediction direction is smaller.

3. An image encoding apparatus comprising:
a weighting coefficient generation unit that generates weighting coefficients that are used when a pseudo intra-predicted image is generated from a quantization step size of predicted pixels of neighboring pixels for an intra-prediction direction;
a pseudo intra-predicted pixel generation unit that generates reference pixels using the weighting coefficients from the predicted pixels of the neighboring pixels and pixels of an original image, and generates pseudo intra-predicted pixels from the reference pixels and intra-prediction directions;
a coding cost calculation unit that calculates coding costs for the intra-prediction directions from errors between the pseudo intra-predicted pixels and the pixels of the original image and generated bit amounts when the pseudo intra-predicted pixels are generated; and
an intra-prediction direction setting unit that sets an intra-prediction direction corresponding to the lowest coding cost among the coding costs as an optimal intra-prediction direction.

4. The image encoding apparatus according to claim 3, wherein a coding cost for an intra-prediction direction set in units of blocks is compared with a coding cost for a mode other than an intra-prediction mode, and intra-prediction is performed again using a neighboring decoded image on a block in which the coding cost for the optimal intra-prediction direction is smaller.

* * * * *